Patented Nov. 17, 1931

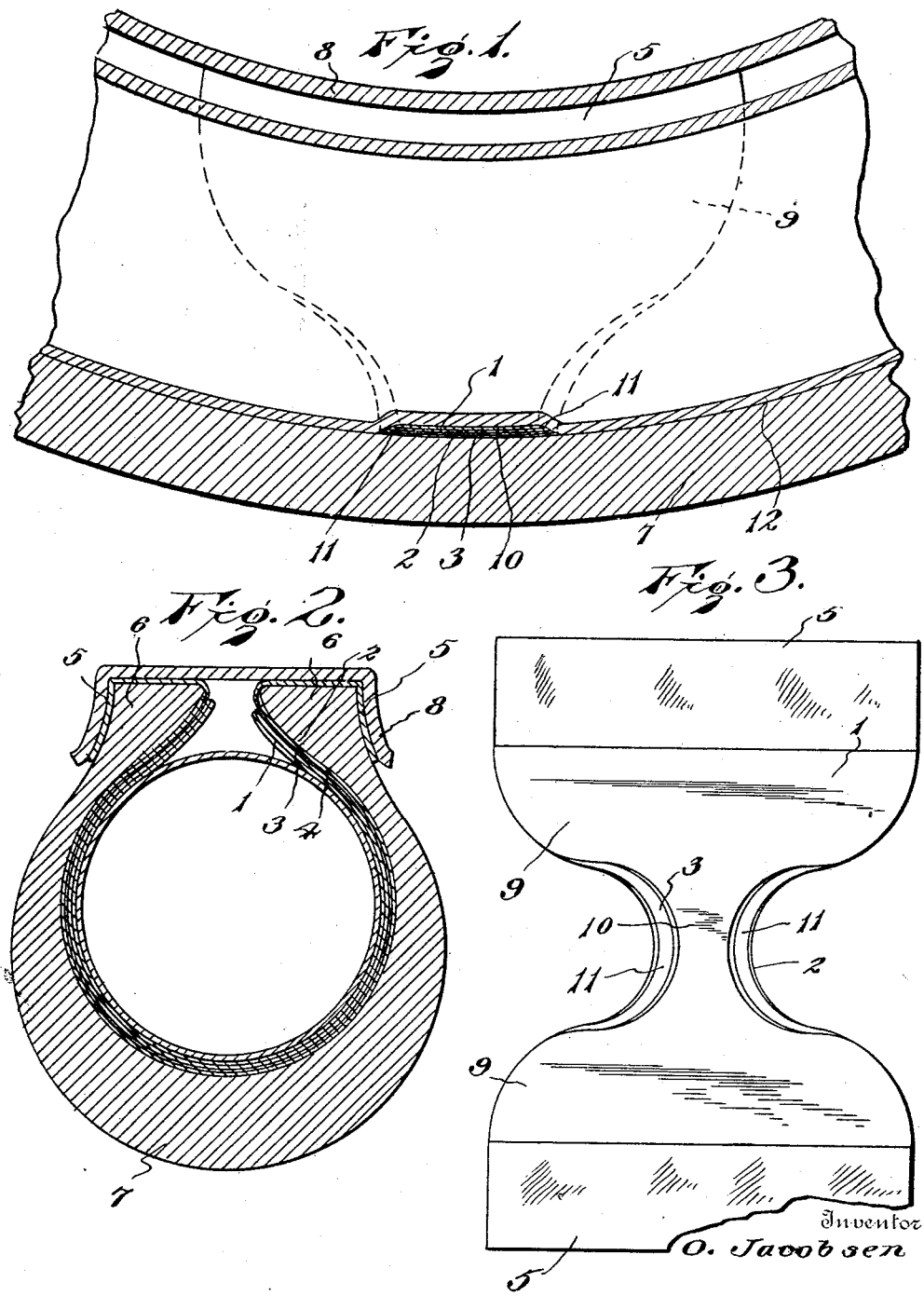

1,832,213

UNITED STATES PATENT OFFICE

OTTO JACOBSEN, OF MONROE, LOUISIANA

BLOW-OUT PATCH

Application filed August 1, 1928. Serial No. 296,724.

This invention relates to pneumatic balloon tires and more particularly to a patch of the type employed when a blow-out occurs.

One object of the invention is to provide a blow-out patch so constructed that its end portions will be of sufficient size to reinforce the side portions of a tire where blow-outs occur and its intermediate portion which fits against the tread portion of a tire reduced in width so that the portion of the patch which fits against the tread portion of the tire will be reduced to a minimum and thereby eliminate a bulge which would cause jolts as the wheel rotates.

Another object of the invention is to so form the reduced intermediate portion of the patch that opposite sides thereof will be formed with feathered edges and thereby very effectively eliminate jolting as a wheel turns.

Another object of the invention is to provide the patch with a layer of fabric or wire screen constituting a reinforcement therefor and having its end portions extended to provide flaps adapted to be disposed transversely across heels of a tire and thereby allow the patch to be very firmly secured by the flaps, being gripped between a wheel rim and the heels of a tire.

The invention is illustrated in the accompanying drawings, wherein

Figure 1 is a longitudinal sectional view through a portion of a tire and rim with the improved patch in place;

Fig. 2 is a transverse sectional view through a tire and rim with the patch in place, and Fig. 3 is a view looking at the inner face of the patch.

The improved patch constituting the subject-matter of this invention consists of a flexible body formed of sheet material. The flexible body consists of inner and outer layers 1 and 2 formed of sheet rubber of sufficient thickness to have the necessary strength and between the layers 1 and 2 is disposed a core 3 also formed of sheet rubber and preferably having fabric or wire screen embedded therein to add strength and durability to the patch. A sheet of fabric 4 is provided between the core 3 and outer layer 2 of sheet rubber and this fabric has its end portions projecting from the body to provide flaps 5 which extend the full width of the ends of the body and are of such length that they may be disposed transversely about the heels 6 of a tire 7 and by being gripped between the heels of the tire and the rim 8 of a wheel firmly hold the patch in its proper position with respect to a tire which has become damaged by a blow-out. It will thus be seen that the patch will be flexible so that it can fit smoothly into place when applied to a tire and the sheet of fabric or wire screen will serve not only as reinforcing means for the body portion of the patch but also constitute securing flaps by means of which the patch may be firmly held in place.

By referring to Fig. 3, it will be seen that the intermediate portion of the body is reduced in width thereby forming end portions 9 which are connected by a reduced neck 10. The side edges of the end portions and neck are curved in opposite directions and, therefore, the neck gradually increases in width towards its ends and its side edges merge into the side edges of the end portions. It should also be noted that along its sides the neck is beveled from its inner surface, as shown at 11, thereby providing the neck with feathered side edges so that, when the patch is applied to a tire about the inner tube 12, its outer surface will have flat contacting engagement with the inner surface of the tire casing and the inner tube may fit snugly against the inner surface of the patch and have proper contacting engagement with the patch and inner surface of the tire casing without ridges being formed across the tread portion of the tire at opposite sides of the neck. It will thus be seen that when a wheel carrying a tire to which one of the improved patches has been applied is rotating the tread portion of the tire will be smooth and the wheel can rotate without jolting being caused by a rough place in a tire. Reducing the width of the intermediate portion of the patch which extends across the tread portion of the tire also relieves the tube from unnecessary strain and thereby eliminates danger of the tube being worn during the time a patch is in place.

Having thus described the invention, I claim:

A blow-out patch for tires comprising a body consisting of a plurality of layers of flexible sheet material secured in face to face contact with each other, one sheet being of greater length than the others and having its end portions extended to form securing flaps for connecting ends of the body with heels of a tire, said body being reduced in width midway its length to form wide end portions and a pronounced narrow neck connecting the same, said neck gradually increasing in width towards its ends and having concaved arcuate side edges merging into the convexed arcuate side edges of inner ends of the end portion of the body, the inner surface of said neck being beveled along its side edges to provide crescent shaped feathered edges extending the full length of the neck.

In testimony whereof I affix my signature.

OTTO JACOBSEN. [L. S.]